No. 607,062. Patented July 12, 1898.
T. R. MAGUIRE.
AMUSING AND MYSTIFYING COIN-IN-THE-SLOT MACHINE.
(Application filed Mar. 1, 1897.)
(No Model.)
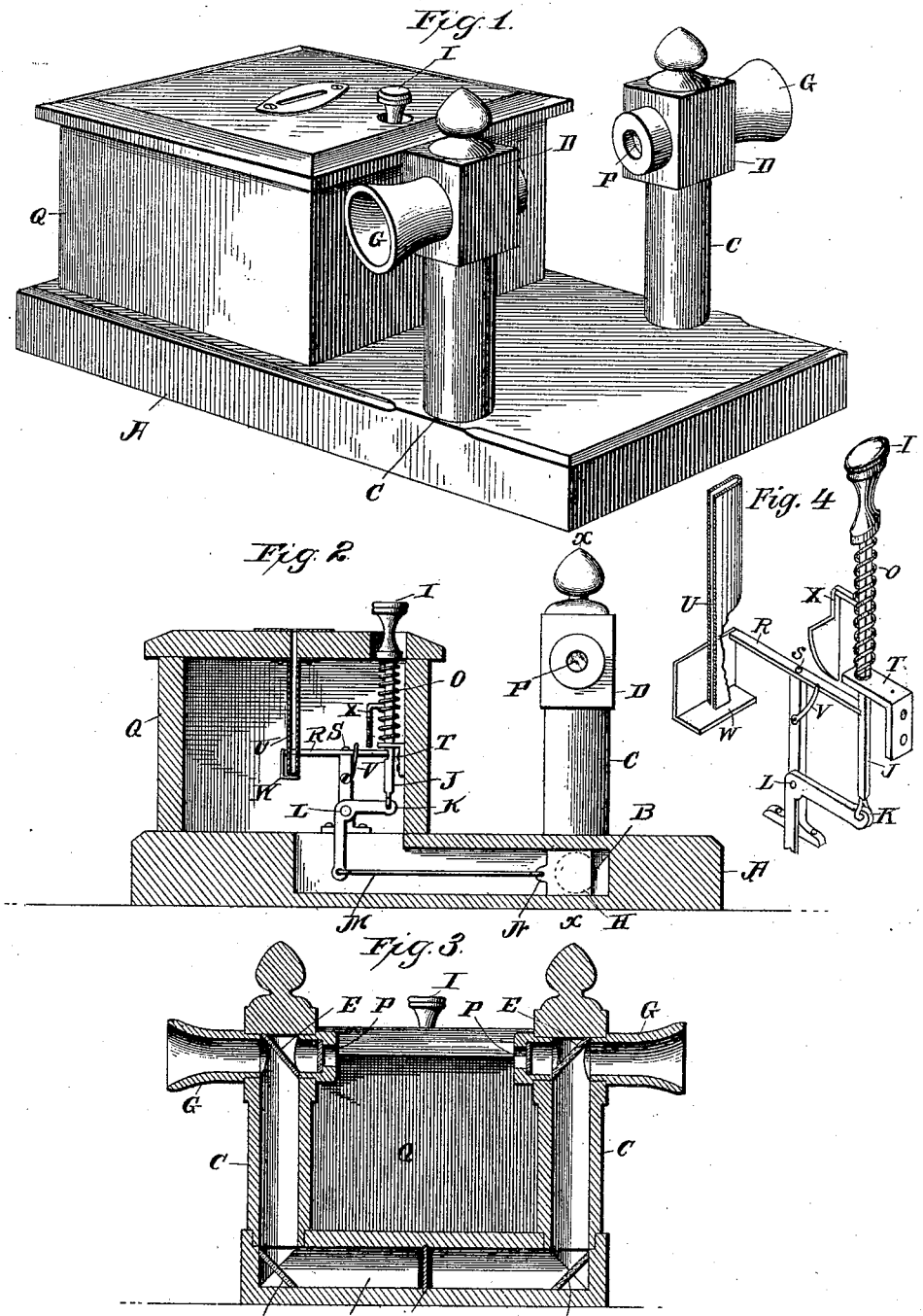
Witnesses
Inventor
Thomas R. Maguire

UNITED STATES PATENT OFFICE.

THOMAS R. MAGUIRE, OF PHILADELPHIA, PENNSYLVANIA, ASSIGNOR OF ONE-HALF TO JOHN J. BRADLEY, OF SAME PLACE.

AMUSING AND MYSTIFYING COIN-IN-THE-SLOT MACHINE.

SPECIFICATION forming part of Letters Patent No. 607,062, dated July 12, 1898.

Application filed March 1, 1897. Serial No. 625,506. (No model.)

*To all whom it may concern:*

Be it known that I, THOMAS R. MAGUIRE, a citizen of the United States, residing at Philadelphia, in the county of Philadelphia and State of Pennsylvania, have invented a certain new and useful Improvement in Amusing and Mystifying Coin-in-the-Slot Machines, of which the following is a specification.

My invention relates to a new and amusing and mystifying coin-in-the-slot machine which consists of mechanism adapted to be controlled by a coin dropped within the box by means of which the reflection of the mirrors is intercepted and can only be opened by the introduction of a proper coin.

In order that those skilled in the art to which this invention appertains may understand how to make and use the same, its construction and operation will now be described in detail, referring to the accompanying drawings, forming a part of this specification, in which—

Figure 1 is a perspective of my improvement; Fig. 2, a longitudinal section thereof, showing the coin mechanism and shutter connected therewith; and Fig. 3, a section at the line $x\ x$ of Fig. 2. Fig. 4 is a detail perspective view of the controlling mechanism, the coin-chute being shown in section.

In carrying out my invention as here embodied I provide a base A, in which is formed a cavity B, running crosswise thereof, and upon this base are mounted the hollow posts C. The upper ends of these posts are preferably secured so as to provide the heads D, and in these heads are located the mirrors E, which are set at forty-five degrees, as clearly shown in Fig. 3. Corresponding mirrors F are located at the same angle within the ends of the cavity B and in line with the hollows in the posts, so that an image reflected by either of the mirrors E will be rereflected by the mirrors F, so as to appear in the opposite mirror E, and for convenience and to assist in the mystifying of the beholder eyepieces G project outward from the heads of the posts. By this arrangement it will be seen that a person looking through one of the eyepieces will behold the image, such as a landscape or person, within the range of the opposite eyepiece, and a solid body interposed between the posts upon the outside of the apparatus will have no effect upon this observation; but in order to interrupt the view a shutter H is arranged to slide crosswise of the cavity B, and this shutter is under control of the thumb-knob I, mounted upon the upper end of the operating-rod J, the lower end of which latter is connected to the horizontal arm of the bell-crank lever K, which is pivoted at L. The vertical member of this bell-crank lever has attached thereto the rod M, which in turn is connected at N to the shutter, so that it is only necessary to depress the thumb-knob to withdraw the shutter from between the mirrors F, thus permitting the reflection upon one of the mirrors to be rereflected upon the other mirror, and thus upward to one of the mirrors E, and when pressure is removed from the thumb-knob the spring O, which is coiled about the rod J, will return said rod to its normal position, as is well understood.

As a further means of mystifying a person looking through the apparatus or examining the same mirrors P are set in the inner portions of the heads, which are bossed for this purpose and have holes formed in said bosses. Thus when a person looks at the inside of one of the posts an apparent open hole is presented on account of the reflection upon the mirror therein.

To adapt my improvement for use as a coin-in-the-slot apparatus, I mount a box Q upon the base, and in this box is arranged the controlling mechanism, which is as follows: A locking-lever R is pivoted at S to an upright post, and the outer end of this lever is adapted to enter into engagement with a notch T, formed in the operating-rod J, and the inner end of the lever lies adjacent to and partly within the coin-chute U, the latter extending downward from the top of the box, as clearly shown. A spring V is adapted to hold the lever R in its locked position, and when a coin of proper size is dropped within the chute it first comes in contact with the inner end of the lever and cams the latter outward sufficiently to withdraw its inner end from the notch T, and when this is done it will be seen that the rod J will be freed, so that it may be readily depressed against the action of the spring O; but the coin will be prevented from falling from the chute and out of engagement with the lever by the shield W, which is secured to said lever and extends beneath the end of the chute. Now after the rod J is unlocked the depression thereof will cause the cam X to force the lever R farther in the same direction in which the coin has moved it, and this further movement of the lever will carry the shield from beneath the lower end of the chute and permit the coin to drop within the box, after which the lever R will be returned to its normal position by the spring V, thus again locking the operating-lever and holding the shutter in position between the two mirrors F.

When in use, the fact that the two posts project so prominently from the top of the base and the eyepieces thereof being in line with each other gives the appearance that for observing therethrough it is necessary to have a clear opening between the eyepieces, and thus an observer is greatly mystified when a solid opaque body is placed between these eyepieces from the fact that the view is not thereby interrupted, and when properly labeled the observer may be led to believe that some mysterious force, such as X-rays, is utilized in bringing about this result. It is to be noted that the same result will be had whether the observer looks through one or the other of the eyepieces, since the mirrors are so set that whatever is reflected upon one of the mirrors E is transmitted to the other mirror E, and vice versa.

Having thus fully described my invention, what I claim as new and useful is—

1. In combination, a base having a cavity B therein, two hollow posts mounted upon said base, mirrors E set at forty-five degrees in the upper portion of the posts, mirrors F set at forty-five degrees within the cavity within the base and in line with the first-named mirrors, eyepieces for observing reflections upon the first-named mirrors, a shutter normally interposed between the mirrors F, mechanism attached to said shutter whereby the latter may be withdrawn from its normal position, a spring for returning said mechanism to its normal position, a lever adapted to lock said mechanism, and a chute arranged adjacent to said lever so that a coin passed therein will unlock the shutter mechanism, substantially as shown and described.

2. The herein-described combination of the base, having a cavity therein, mirrors F set at forty-five degrees within said cavity, hollow posts C projecting upward from the base, mirrors E arranged in the upper portion of said posts, eyepieces G for observing reflections upon the last-named mirrors, mirrors P arranged in the rear portion of the posts, a shutter normally interposed between the mirrors F, a bell-crank lever, a rod connecting said shutter and lever, an operating-rod attached to the bell-crank lever, a spring for normally holding said rod in its elevated position, a thumb-knob for depressing said rod, a pivoted lever R, one end of which is adapted to enter into engagement with the notch formed in the rod J, a spring for holding the lever in its locked position, a chute against which the lever R normally rests, a shield carried by said lever, and a cam carried by the rod J for removing said shield from beneath the chute, substantially as and for the purpose set forth.

3. In a device of the character described, a coin-chute, a shutter, a rod arranged to move the shutter back and forth, a lever pivoted at its center, one end engaging a notch in the rod to prevent its movement and the other end extending partly within the coin-chute whereby the edge of a coin will move the lever out of engagement with the rod, a shield on the lever closing the end of the chute until the lever is disengaged from the rod and pushed to one side, and means on the rod for forcing the end carrying the shield away from the coin-chute, as and for the purpose described.

In testimony whereof I have hereunto affixed my signature in the presence of two subscribing witnesses.

THOMAS R. MAGUIRE.

Witnesses:
S. S. WILLIAMSON,
R. M. PIERCE.